(12) United States Patent
Park et al.

(10) Patent No.: US 11,651,224 B2
(45) Date of Patent: May 16, 2023

(54) METHOD FOR FORMATTING A WEIGHT MATRIX, ACCELERATOR USING THE FORMATTED WEIGHT MATRIX, AND SYSTEM INCLUDING THE ACCELERATOR

(71) Applicants: SK hynix Inc., Icheon (KR); POSTECH ACADEMY-INDUSTRY FOUNDATION, Pohang (KR)

(72) Inventors: Junki Park, Pohang (KR); Jae-Joon Kim, Pohang (KR)

(73) Assignees: SK hynix Inc., Icheon (KR); POSTECH ACADEMY-INDUSTRY FOUNDATION, Pohang (KR)

( * ) Notice: Subject to any disclaimer, the term of this patent is extended or adjusted under 35 U.S.C. 154(b) by 1067 days.

(21) Appl. No.: 16/362,398

(22) Filed: Mar. 22, 2019

(65) Prior Publication Data
US 2019/0347555 A1    Nov. 14, 2019

(30) Foreign Application Priority Data
May 9, 2018    (KR) .................. 10-2018-0052920

(51) Int. Cl.
*G06N 20/10*    (2019.01)
*G06N 3/082*    (2023.01)
*G06N 3/063*    (2023.01)
*G06F 17/16*    (2006.01)
(Continued)

(52) U.S. Cl.
CPC .......... *G06N 3/082* (2013.01); *G06F 9/5027* (2013.01); *G06F 17/16* (2013.01); *G06N 3/063* (2013.01); *G06N 5/04* (2013.01); *G06N 20/10* (2019.01)

(58) Field of Classification Search
CPC .......... G06N 3/082; G06N 3/063; G06N 5/04; G06N 20/10; G06N 3/0454; G06N 3/0445; G06N 3/084; G06F 9/5027; G06F 17/16; G06F 9/5061
See application file for complete search history.

(56) References Cited

U.S. PATENT DOCUMENTS 9,367,519 B2    6/2016  Strauss et al.
9,830,302 B1 *  11/2017 Rub ....................... G06F 17/16
10,127,495 B1 * 11/2018 Bopardikar ............. G06N 3/04
(Continued)

OTHER PUBLICATIONS

Mathworks, "Permutation and Reodering", accessed via Wayback Machine on May 2, 2018, accessed from <https://web.archive.org/web/20180502110028/http://matlab.izmiran.ru/help/techdoc/math/sparse17.html>, pp. 1-3 (Year: 2018).*
(Continued)

*Primary Examiner* — David R Vincent (57) ABSTRACT

A method formats a weight matrix in a current layer included in a neural network. The method includes calculating a row length for each row of the weight matrix based on a number of elements each of which has non-zero value; storing rearrangement information including result of sorting rows in the order of row lengths; performing a row transformation or the row transformation and a column transformation on the weight matrix using the rearrangement information; distributing rows of a transformed weight matrix to a plurality of processing elements (PEs); and generating formatted data including one or more group data each including values and column information being processed in each of the PEs.

8 Claims, 11 Drawing Sheets

(51) Int. Cl.
  G06N 5/04 (2023.01)
  G06F 9/50 (2006.01)

(56) References Cited

U.S. PATENT DOCUMENTS

| | | | | |
|---|---|---|---|---|
| 10,354,733 | B1* | 7/2019 | Zejda | G06N 3/0454 |
| 10,810,484 | B2* | 10/2020 | Xie | G06N 3/0445 |
| 2019/0087729 | A1* | 3/2019 | Byun | G06N 3/084 |
| 2021/0286789 | A1* | 9/2021 | Araki | G06F 17/16 |

OTHER PUBLICATIONS

K. Cho et al., "Learning phrase representations using RNN encoderdecoder for statistical machine translation," abs/1406.1078, 2014. [Online]. Available: http://arxiv.org/abs/1406.1078.

A. Graves, A.-r. Mohamed, and G. Hinton, "Speech recognition with deep recurrent neural networks," Proc. IEEE Intl. Conf. Acoustics, Speech and Signal Processing (ICASSP), pp. 6645-6649, Mar. 2013.

M. K ock and A. Paramythis, "Activity sequence modelling and dynamic clustering for personalized e-learning," User Modeling and User-Adapted Interaction, vol. 21, No. 1, pp. 51-97, Apr. 2011.

H. Yu et al., "Video paragraph captioning using hierarchical recurrent neural networks," abs/1510.07712, 2015. [Online]. Available: http://arxiv.org/abs/1510.07712.

S. Hochreiter and J. Schmidhuber, "Long short-term memory," Neural Computation, vol. 9, No. 8, pp. 1735-1780, 1997.

S. Hochreiter et al., "Gradient flow in recurrent nets: the difficulty of learning long-term dependencies," 2001.

Y. Guan, Z. Yuan, G. Sun, and J. Cong, "FPGA-based accelerator for long short-term memory recurrent neural networks," in Asia South Pacific Design Autom. Conf. (ASP-DAC), Jan. 2017, pp. 62-634.

P. Ouyang, S. Yin, and S. Wei, "A fast and power efficient architecture to parallelize LSTM based RNN for cognitive Intelligence applications," in Proc. Design Autom. Conf. (DAC), Jun. 2017, pp. 63:1-63:6.

S. Han et al., "ESE: Efficient speech recognition engine with sparse lstm on fpga," in Proc. ACM/SIGDA Intl. Symp. Field-Programmable Gate Arrays.

Y. H. Chen, T. Krishna, J. S. Emer, and V. Sze, "Eyeriss: An energy efficient reconfigurable accelerator for deep convolutional neural networks," IEEE Journal of Solid-State Circuits (JSSC), vol. 52, No. 1, p. 12✗ 138, Jan. 2017.

S. Han et al., "EIE: Efficient inference engine on compressed deep neural network," in Proc. Intl. Symp. Computer Architecture (ISCA), 2016, pp. 243-254.

A. See, M. Luong, and C. D. Manning, "Compression of neural machine translation models via pruning," abs/1606.09274,2016. [Online]. Available: http://arxiv.org/abs/1606.09274.

J. Fowers et al., "A high memory bandwidth FPGA accelerator for sparse matrix-vector multiplication," in IEEE Int. Symp. Field-Programmable Custom Computing Machines (FCCM), 2014, pp. 36-43.

M. Abadi et al., "TensorFlow: Large-scale machine learning on heterogeneous distributed systems," abs/1603.04467, 2016 [Online]. Available: http://arxiv.org/abs/1603.04467.

J. S. Garafolo et al. (1993) TIMIT acoustic-phonetic continuous speech corpus. [Online], Available: https://catalog.ldc.upenn.edu/ldc93s1.

X. Taylor, M. Marcus, and B. Santorini, "The Penn Treebank: an overview," in Treebanks. Springer, 2003, pp. 5-22.

* cited by examiner

$$\begin{bmatrix} W_{xi} & W_{hi} \\ W_{xc} & W_{hc} \\ W_{xf} & W_{hf} \\ W_{xo} & W_{ho} \end{bmatrix} \times \begin{bmatrix} x_t \\ h_{t-1} \end{bmatrix}$$

$$\begin{bmatrix} W_{xi} & W_{hi} & W_{xc} & W_{hc} & W_{xf} & W_{hf} & W_{xo} & W_{ho} \end{bmatrix} \times \begin{bmatrix} x_t & h_{t-1} & x_t & h_{t-1} & x_t & h_{t-1} & x_t & h_{t-1} \end{bmatrix}$$

$$\begin{bmatrix} W_{xi} & W_{xc} & W_{xf} & W_{xo} & W_{hi} & W_{hc} & W_{hf} & W_{ho} \end{bmatrix} \times \begin{bmatrix} x_t & x_t & x_t & x_t & h_{t-1} & h_{t-1} & h_{t-1} & h_{t-1} \end{bmatrix}$$

| | 0 | 1 | 2 | 3 | 4 | 5 | 6 | 7 |
|---|---|---|---|---|---|---|---|---|
| 7 | | | | | | | | |
| 6 | | | | | | | | p |
| 5 | | c | | | | j | o | |
| 4 | | | | e | g | | n | |
| 3 | | b | | d | | l | | |
| 2 | | | | f | | i | | |
| 1 | | a | | | | | | |
| 0 | | | | | | | m | |
| 7 | | | | H | K | | | |
| 6 | | | | | J | | | P |
| 5 | | | | D | E | G | O | |
| 4 | | | | | | | | |
| 3 | | B | C | | | L | | M |
| 2 | | | | | | I | | |
| 1 | | | | F | | | N | |
| 0 | | A | | | | | | |

$W_h$ brackets rows 0–7 (upper, lowercase); $W_x$ brackets rows 0–7 (lower, uppercase).

FIG. 5A

| RID | RLEN |
|-----|------|
| 0 | 5 |
| 1 | 3 |
| 2 | 4 |
| 3 | 4 |
| 4 | 6 |
| 5 | 4 |
| 6 | 3 |
| 7 | 3 |

FIG. 5B

| RID | RLEN |
|-----|------|
| 4 | 6 |
| 0 | 5 |
| 2 | 4 |
| 3 | 4 |
| 5 | 4 |
| 1 | 3 |
| 6 | 3 |
| 7 | 3 |

FIG. 5C

| RID | ORID |
|-----|------|
| 0 | 4 |
| 1 | 0 |
| 2 | 2 |
| 3 | 3 |
| 4 | 5 |
| 5 | 1 |
| 6 | 6 |
| 7 | 7 |

FIG. 6

| | | CID | | | | | | | | |
|---|---|---|---|---|---|---|---|---|---|---|
| 15 | 7 | | | | h | | | | | |
| 14 | 6 | k | | | | | | | p | |
| 13 | 5 | j | c | | | | | | | |
| 12 | 4 | | | g | | o | e | | | |
| 11 | 3 | | b | | | n | d | | | |
| 10 | 2 | i | | f | | l | | | | |
| 9 | 1 | | a | | | | | | | |
| 8 | 0 | | | | | | m | | | |
| 7 | 7 | K | | H | | | | | | |
| 6 | 6 | J | | | | | | P | | |
| 5 | 5 | | E | G | | | O | | | |
| 4 | 4 | | D | | | | | | | |
| 3 | 3 | B | | | L | C | | M | | |
| 2 | 2 | I | | | | | | | | |
| 1 | 1 | | | F | | | N | | | |
| 0 | 0 | A | | | | | | | | |
| | | 4 | 0 | 2 | 3 | 5 | 1 | 6 | 7 | RID |
| | | 0 | 1 | 2 | 3 | 4 | 5 | 6 | 7 | GRID |

| CID | 15 | 14 | 13 | 12 | 11 | 10 | 9 | 8 | 7 | 6 | 5 | 4 | 3 | 2 | 1 | 0 | | |
|---|---|---|---|---|---|---|---|---|---|---|---|---|---|---|---|---|---|---|
| OCID | 7 | 6 | 1 | 5 | 3 | 2 | 0 | 4 | 7 | 6 | 5 | 4 | 3 | 2 | 1 | 0 | | |
| | | k | | j | | i | | | K | J | | | | | | | | |
| | | | a | c | b | | | | | | | | B | | | A | | |
| | h | | | | | | | g | H | | E | D | | | F | | | |
| | | | | | | f | | | | G | | | | | | | | |
| | | | | | n | | o | e | | | | | L | | | | | |
| | | | | | d | | | | | | O | | C | | N | | | |
| | | p | | | | | m | | | P | | | M | | | | | |
| | 4 | 0 | 2 | 3 | 5 | 1 | 6 | 7 | | | | | | | | | ORID | RID |
| | 0 | 1 | 2 | 3 | 4 | 5 | 6 | 7 | | | | | | | | | | |

FIG. 8A

| PE | ORID | RLEN |
|---|---|---|
| 0 | 4 | 6 |
| 1 | 0 | 5 |
| 2 | 2 | 4 |
| 3 | 3 | 4 |
| 3 | 5 | 4 |
| 2 | 1 | 3 |
| 1 | 6 | 3 |
| 0 | 7 | 3 |

FIG. 8B

| PE | ORID | VAL (Sum of row lengths) |
|---|---|---|
| 0 | 4, 7 | I, J, K, i, j, k, M, P, p (9) |
| 1 | 0, 6 | A, B, b, c, a, N, O, m (8) |
| 2 | 2, 1 | D, E, g, f, C, e, d (7) |
| 3 | 3, 5 | F, G, H, h, L, o, l, n (8) |

FIG. 9A

CLK0:

| PE | 0 | 1 | 2 | 3 |
|---|---|---|---|---|
| VAL | I | A | D | F |
| CID | 2 | 0 | 4 | 1 |

CLK1:

| PE | 0 | 1 | 2 | 3 |
|---|---|---|---|---|
| VAL | J | B | E | G |
| CID | 6 | 3 | 5 | 5 |

CLK2:

| PE | 0 | 1 | 2 | 3 |
|---|---|---|---|---|
| VAL | K | b | g | H |
| CID | 7 | 11 | 8 | 7 |

CLK3:

| PE | 0 | 1 | 2 | 3 |
|---|---|---|---|---|
| VAL | i | c | f | h |
| CID | 10 | 12 | 10 | 15 |

CLK4:

| PE | 0 | 1 | 2 | 3 |
|---|---|---|---|---|
| VAL | j | a | C | L |
| CID | 12 | 13 | 3 | 3 |

CLK5:

| PE | 0 | 1 | 2 | 3 |
|---|---|---|---|---|
| VAL | k | N | e | o |
| CID | 14 | 1 | 8 | 8 |

CLK6:

| PE | 0 | 1 | 2 | 3 |
|---|---|---|---|---|
| VAL | M | O | d | l |
| CID | 3 | 5 | 11 | 10 |

CLK7:

| PE | 0 | 1 | 2 | 3 |
|---|---|---|---|---|
| VAL | P | m |   | n |
| CID | 6 | 9 |   | 11 |

CLK8:

| PE | 0 | 1 | 2 | 3 |
|---|---|---|---|---|
| VAL | p |   |   |   |
| CID | 14 |   |   |   |

FIG. 9B

| RLEN | 6 | 5 | 4 | 4 | 3 | 3 | 3 |
|---|---|---|---|---|---|---|---|

FIG. 9C

| RPtr | 0 | 6 | 11 | 15 | 19 | 23 | 26 | 29 | 32 |
|---|---|---|---|---|---|---|---|---|---|

METHOD FOR FORMATTING A WEIGHT MATRIX, ACCELERATOR USING THE FORMATTED WEIGHT MATRIX, AND SYSTEM INCLUDING THE ACCELERATOR

CROSS-REFERENCE TO RELATED APPLICATIONS

The present application claims priority under 35 U.S.C. § 119(a) to a Korean Patent Application No. 10-2018-0052920, filed on May 9, 2018, which are incorporated herein by reference in its entirety.

BACKGROUND

1. Technical Field

Various embodiments generally relate to a method of formatting a weight matrix used for a neural network, an accelerator using the formatted weight matrix, and a system including the accelerator.

2. Related Art

Various kinds of neural networks are used in the field of artificial intelligence technology such as speech recognition, image recognition, and machine translation.

A neural network includes a plurality of layers each of which contains multiple neurons that are connected with synapses.

A weight is assigned to each of the synapses. A weight matrix includes a plurality of weights arranged in rows and columns.

The weights constituting the weight matrix are determined in advance through a training process.

Various techniques have been developed to reduce a data size of the weight matrix in order to reduce memory capacity that is required to store the weight matrix.

For example, a pruning technique may be applied to make some weights of the weight matrix be zero.

In the pruned weight matrix, a weight being a zero value does not affect a result of the multiplication between the weight matrix and an input vector, so that the weight matrix can be formatted so as not to load weights having zero values into a memory.

Commonly used formatting methods include a Compressed Sparse Row (CSR) method, a Compressed Sparse Column (CSC) method, and a Compressed Interleaved Sparse Row (CISR) method.

However, since the weight matrix formatted by applying these techniques cannot evenly distribute computation loads to a plurality of processing elements (PEs) included in a neural network processing circuit, there arises a problem that an operation time becomes long.

SUMMARY

In accordance with the present teachings, a method of formatting a weight matrix in a current layer included in a neural network may include determining a row length for each row of the weight matrix, the row length corresponding to a number of elements each having a non-zero value in each row, the weight matrix including a plurality of elements that are arranged in a plurality of rows and a plurality of columns; obtaining rearrangement information including a result of sorting the rows in order of size of the determined row lengths; performing a row transformation on the weight matrix or performing the row transformation and a column transformation on the weight matrix, using the rearrangement information, thereby generating a transformed weight matrix; distributing rows of the transformed weight matrix to a plurality of processing elements (PEs); and generating formatted data including one or more data groups each including non-zero values of elements of the transformed weight matrix that are processed in the PEs and column information of the non-zero values.

In accordance with the present teachings, an accelerator may include a processing element (PE) array including a plurality of PEs; an output register configured to store an output vector output from the PE array; an input register configured to store an input vector to be provided to the PE array; and a control circuit configured to provide the PE array with formatted data that is generated by formatting a weight matrix such that sums of row lengths of rows of the weight matrix allocated to the plurality of PEs become substantially even, the weight matrix including a plurality of elements that are arranged in a plurality of rows and a plurality of columns, each of the sums of row lengths representing a sum of row lengths of rows allocated to each of the PEs, a row length corresponding to a number of elements each having a non-zero value in a row, wherein the formatted data includes non-zero values of elements allocated to each of the plurality of PEs, column numbers corresponding to the non-zero values, and row information from which row numbers corresponding to the non-zero values are decoded, a column number indicating a column to which a non-zero value belongs, a row number indicating a row to which the non-zero value belongs.

In accordance with the present teachings, a system may include an accelerator including a plurality of PEs; and a neural network application circuit configured to control an inference operation performed in the accelerator by providing the accelerator with an input vector generated from an input signal and formatted data which is generated by formatting a weight matrix such that sums of row lengths of rows of the weight matrix distributed to the plurality of PEs become substantially even, the weight matrix including a plurality of elements that are arranged in a plurality of rows and a plurality of columns, each of the sums of row lengths representing a sum of row lengths of rows allocated to each of the PEs, a row length corresponding to a number of elements each having a non-zero value in a row.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined in accordance with the presented claims and equivalents thereof.

In embodiments of the present disclosure, a Long Short-Term Memory (LSTM) network is used as an example of a neural network. However, embodiments are not limited to the LSTM network. The invention may be applied to any neural network including a fully connected (FC) layer.

Figure 1:
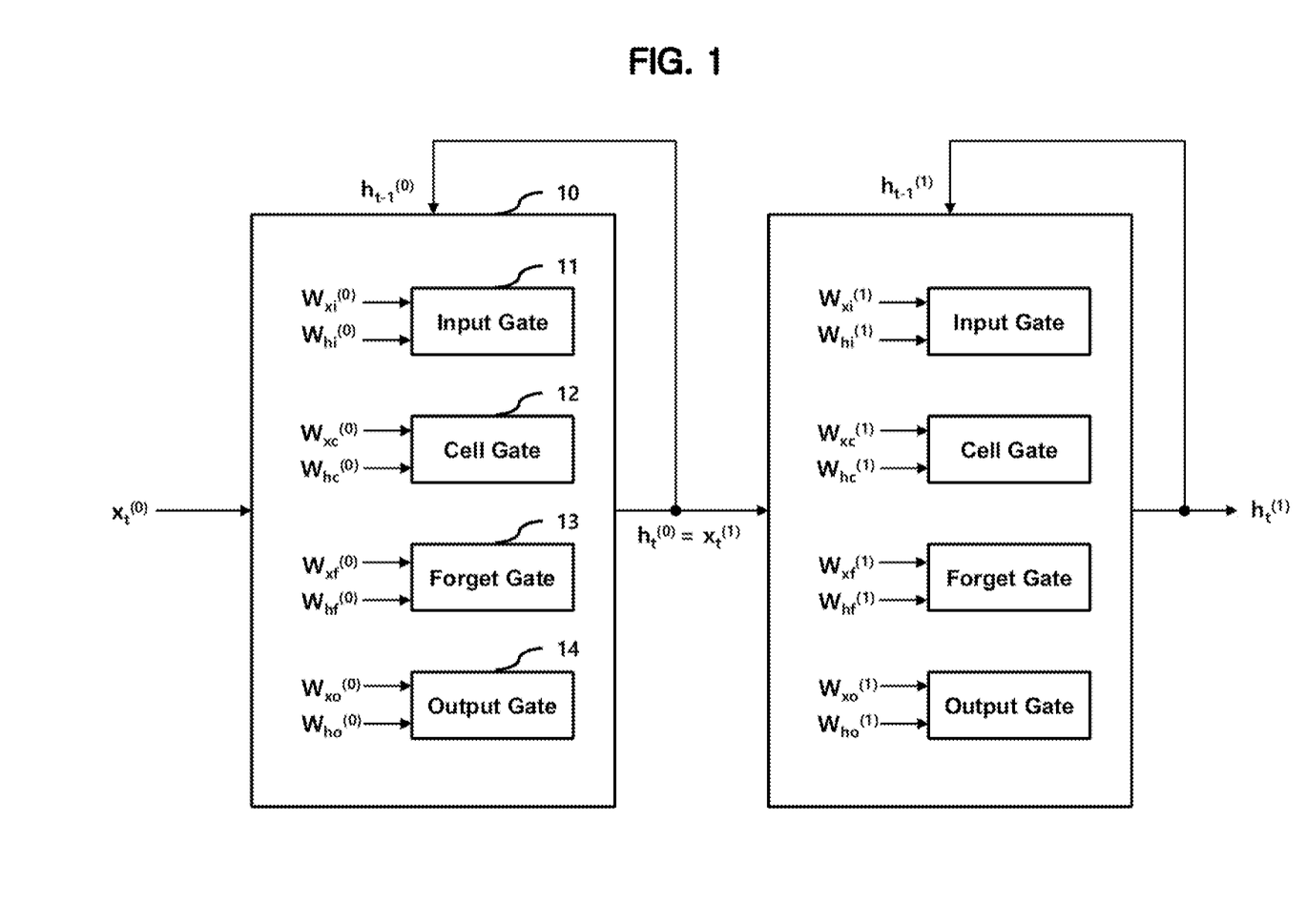
FIG. 1 illustrates a structure of a Long Short-Term Memory (LSTM) network according to an embodiment of the present disclosure.

FIG. 1 illustrates a structure of an LSTM network according to an embodiment of the present disclosure.

In this embodiment, the LSTM network includes a plurality of LSTM layers 10 that includes first and second LSTM layers serially connected.

In FIG. 1, x represents an input vector, h represents an output vector, t in the subscript represents a current time, and t−1 in the subscript represents a previous time. In the superscript, (0) represents the first LSTM layer and (1) represents the second LSTM layer.

The LSTM layer 10 includes an input gate 11, a cell gate 12, a forget gate 13, and an output gate 14.

Each gate computes a first weight matrix $W_x$ and an input vector $x_t$ of a current time, and computes a second weight matrix $W_h$ and an output vector $h_{t-1}$ of a previous time.

The first and second weight matrices $W_x$ and $W_h$ are distinguished according to a type of a gate. For example, a weight matrix $W_{xi}$ used for the input gate 11 uses the subscript i, and a weight matrix $W_{xc}$ used for the cell gate 12 uses the subscript c. A weight matrix $W_{xf}$ used for the forget gate 13 uses the subscript f, and a weight matrix $W_{xo}$ used for the output gate 14 uses the subscript o. A weight matrix $W_{hi}$ is used for the input gate 11, and a weight matrix $W_{hc}$ is used for the cell gate 12. A weight matrix $W_{hf}$ is used for the forget gate 13, and a weight matrix $W_{ho}$ is used for the output gate 14.

The LSTM layer 10 computes vector signals output from the gates 11 to 14 described above and outputs the output vector $h_t$.

Specific equations for generating the output vector $h_t$ in the LSTM layer 10 are well known, and therefore a detailed description thereof will be omitted.

Figure 3A:
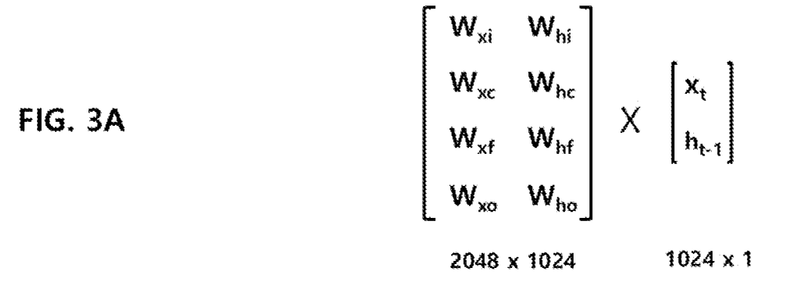
FIG. 3A illustrates a weight matrix prepared according to a conventional method.

The LSTM layer 10 performs a multiplication operation on a weight matrix including four first weight matrices $W_{xi}$, $W_{xc}$, $W_{xf}$, and $W_{xo}$ and four second weight matrices $W_{hi}$, $W_{hc}$, $W_{hf}$, and $W_{ho}$ and a matrix including the input vector $x_t$ and the output vector $h_{t-1}$, as shown in FIG. 3A.

After finishing a training process, the weight matrix is pruned and thus becomes sparse.

The present disclosure provides a method of formatting a pruned weight matrix to reduce a data size and to evenly distribute computation loads to a plurality of processing elements (PEs).

Figure 2:
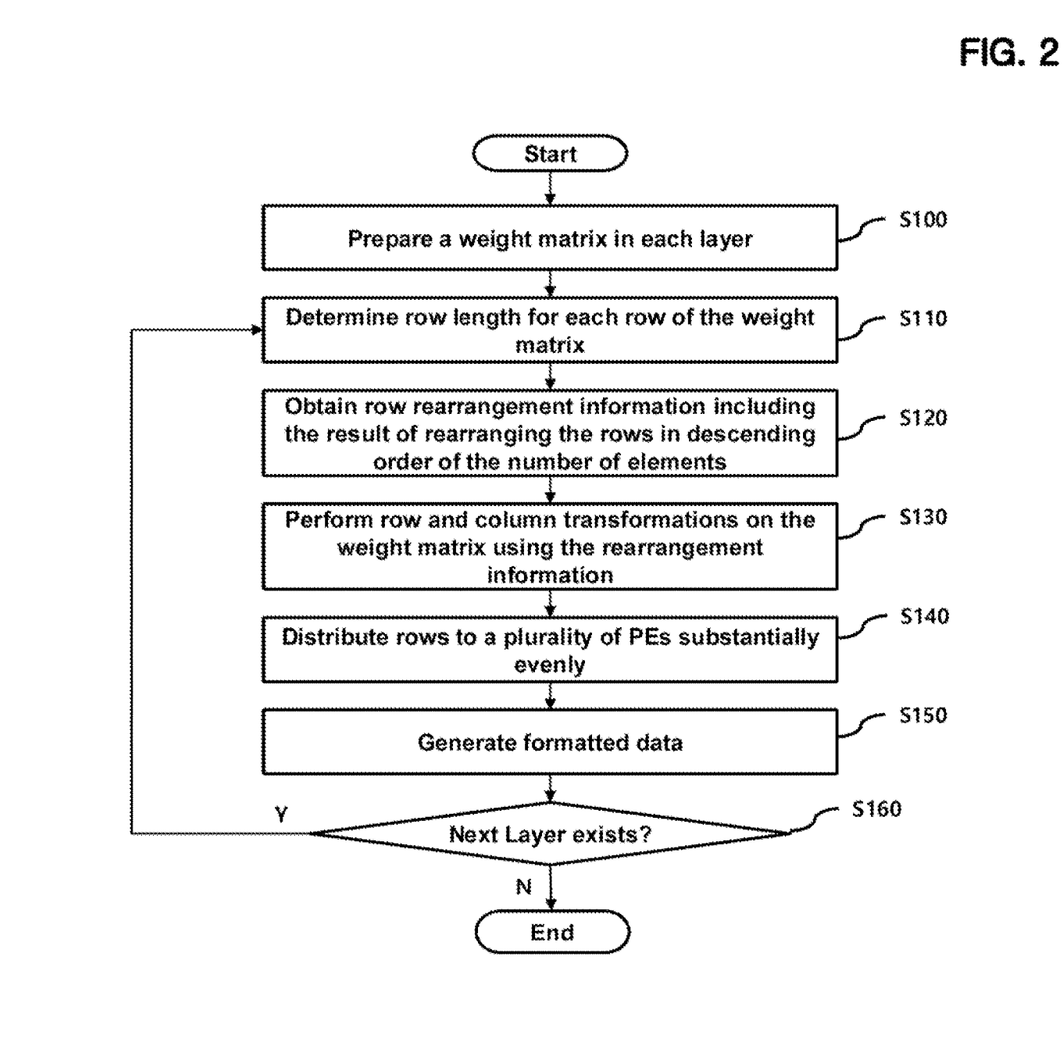
FIG. 2 shows a flow chart illustrating a method of formatting a weight matrix according to an embodiment of the present disclosure.

FIG. 2 shows a flow chart illustrating a method of formatting a weight matrix according to an embodiment of the present disclosure.

First, a weight matrix in each LSTM layer is prepared at step S100.

Figure 3B:
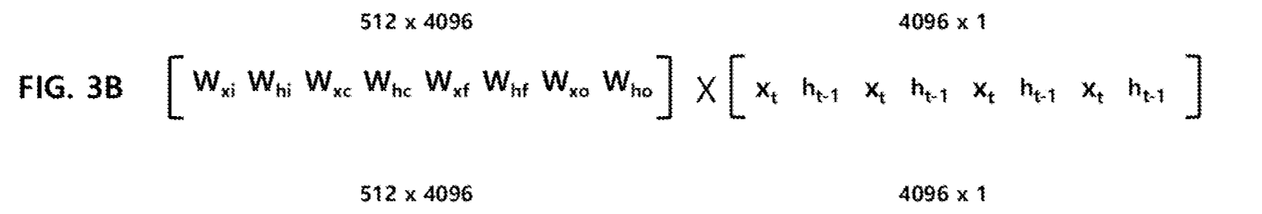
FIGS. 3B and 3C respectively illustrate methods of preparing a weight matrix according to embodiments of the present disclosure.
Figure 3C:
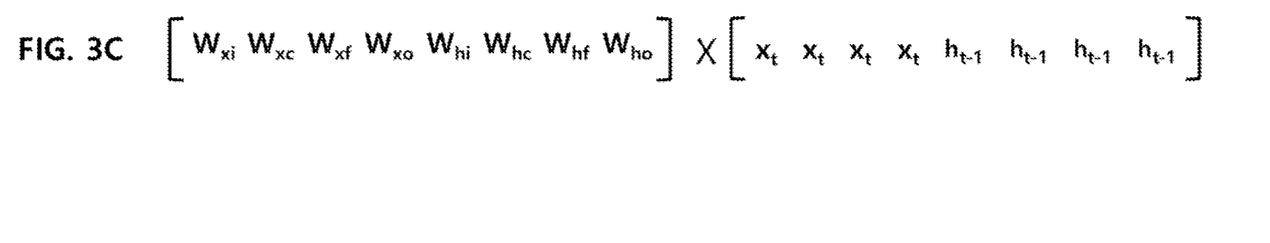

FIGS. 3A to 3C illustrate a method of preparing a weight matrix according to an embodiment of the present disclosure.

FIG. 3A shows a weight matrix prepared according to a conventional method. FIGS. 3B and 3C respectively illustrate methods of arranging a weight matrix according to embodiments of the present disclosure.

In the conventional method illustrated in FIG. 3A, the first weight matrices $W_{xi}$, $W_{xc}$, $W_{xf}$, and $W_{xo}$ are disposed in a first column of a weight matrix, and the second weight matrices $W_{hi}$, $W_{hc}$, $W_{hf}$, and $W_{ho}$ are disposed in a second column of the weight matrix.

In the embodiments of the present disclosure illustrated in FIGS. 3B and 3C, the first weight matrices $W_{xi}$, $W_{xc}$, $W_{xf}$, and $W_{xo}$ and the second weight matrices $W_{hi}$, $W_{hc}$, $W_{hf}$, and $W_{ho}$ are disposed horizontally. That is, the first weight matrices $W_{xi}$, $W_{xc}$, $W_{xf}$, and $W_{xo}$ and the second weight matrices $W_{hi}$, $W_{hc}$, $W_{hf}$, and $W_{ho}$ are disposed in a row.

In the embodiment shown in FIG. 3B, the first weight matrices $W_{xi}$, $W_{xc}$, $W_{xf}$, and $W_{xo}$ and the second matrices $W_{hi}$, $W_{hc}$, $W_{hf}$, and $W_{ho}$ are disposed alternately in a row in the order of the input gate 11, the cell gate 12, the forget gate 13, and the output gate 14.

In the embodiment shown in FIG. 3C, the first weight matrices $W_{xi}$, $W_{xc}$, $W_{xf}$, and $W_{xo}$ for all gates 11, 12, 13, and 14 are disposed horizontally, and then the second weight matrices $W_{hi}$, $W_{hc}$, $W_{hf}$, and $W_{ho}$ for all gates 11, 12, 13, and 14 are disposed horizontally to follow the first weight matrices $W_{xi}$, $W_{xc}$, $W_{xf}$, and $W_{xo}$.

The method of disposing the first weight matrices $W_{xi}$, $W_{xc}$, $W_{xf}$, and $W_{xo}$ and the second weight matrices $W_{hi}$, $W_{hc}$, $W_{hf}$, and $W_{ho}$ may be variously modified with reference to FIGS. 3B and 3C. In the present disclosure, it is assumed that the weight matrix is prepared as shown in FIG. 3C.

Returning to FIG. 2, a row length is determined on the basis of the number of non-zero elements for each row of the weight matrix at step S110.

Figure 4:
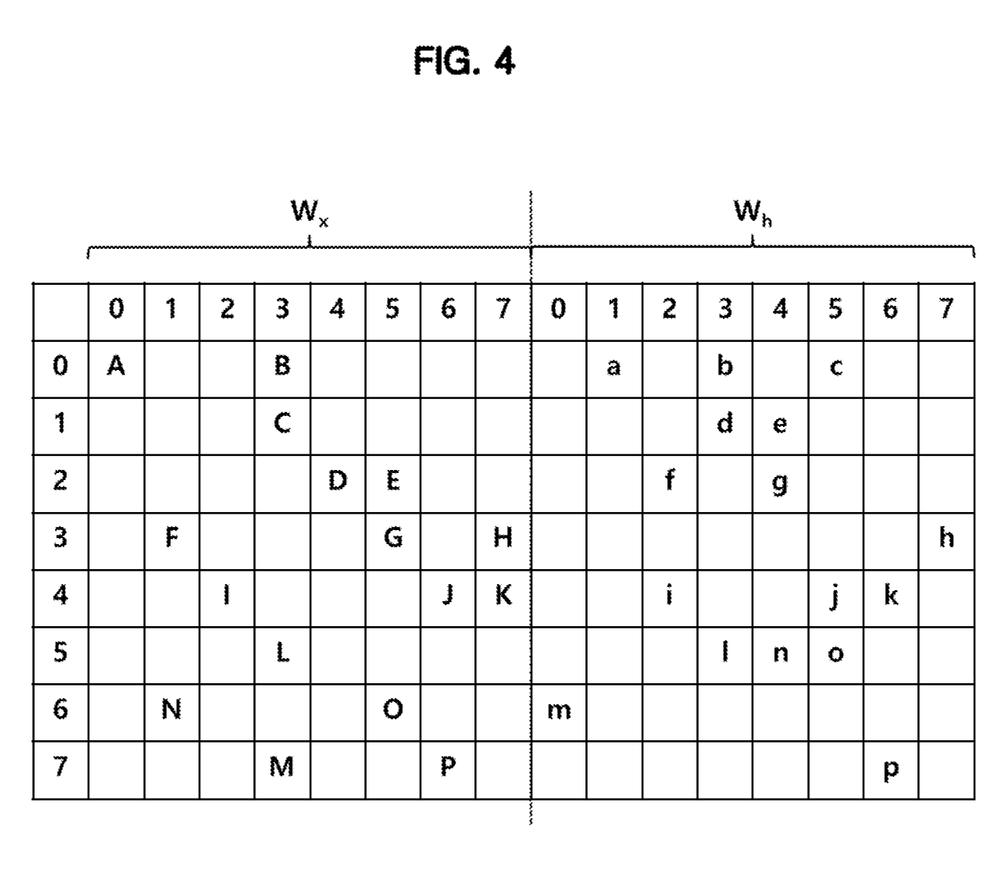
FIG. 4 shows a table illustrating an example of a weight matrix before being formatted.

FIG. 4 shows a table in which the first weight matrix and the second weight matrix are horizontally disposed.

In FIG. 4 and subsequent drawings, the first weight matrix is denoted by $W_x$ and the second weight matrix is denoted by $W_h$.

When the first and second weight matrices are arranged as shown in FIG. 3B, the first weight matrix $W_x$ in FIG. 4 may represent $W_{xi}$, $W_{xc}$, $W_{xf}$ or $W_{xo}$ and the second weight matrix $W_h$ may represent $W_{hi}$, $W_{hc}$, $W_{hf}$ or $W_{ho}$.

In this case, FIG. 4 corresponds to ¼ of the entire weight matrix, and it can be understood that the actual weight matrix includes 4 matrices each similar to a matrix of FIG. 4 in which the first weight matrix $W_x$ and the second weight matrix $W_h$ are disposed horizontally.

When the weight matrix is prepared as shown in FIG. 3C, the first weight matrix $W_x$ in FIG. 4 represents [$W_{xi}$ $W_{xc}$ $W_{xf}$ $W_{xo}$] and correspondingly, the second weight matrix $W_h$ represents [$W_{hi}$ $W_{hc}$ $W_{hf}$ $W_{ho}$].

As aforementioned, it is assumed that the weight matrix is prepared according to FIG. 3C, but it is easily understood by those skilled in the art that the weight matrix may be prepared by differently arranging the first and/or the second weight matrices.

Figure 5A:
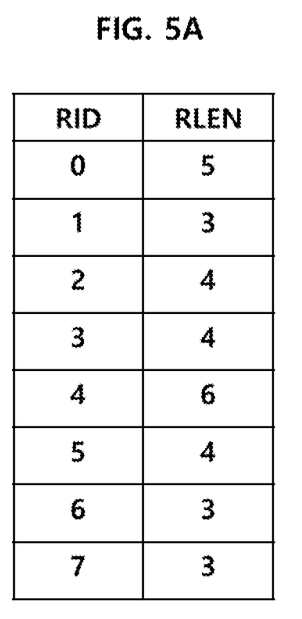
FIGS. 5A to 5C show tables illustrating a method of rearranging rows of a weight matrix according to an embodiment of the present disclosure.
Figure 5B:
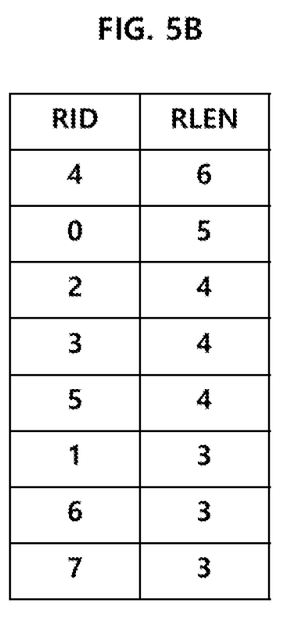
Figure 5C:
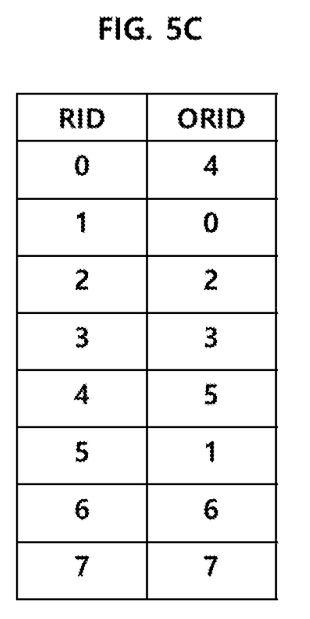

FIGS. 5A to 5C show tables illustrating a method of rearranging rows of a weight matrix according to an embodiment of the present disclosure In FIG. 5A, "RID" represents a row number that indicates a row, and "RLEN" represents a row length that corresponds to a number of non-zero elements included in a corresponding row of the weight matrix.

Returning to FIG. 2, row rearrangement information including a result of rearranging the rows of the weight matrix in descending order of the row length RLEN is obtained, at step S120.

FIG. 5B shows a table representing a result of rearranging the table of FIG. 5A in descending order of the row length RLEN.

FIG. 5C is a table showing the row rearrangement information including a row number RID of the weight matrix after the rearrangement and an original (or old) row number ORID representing a row number of the weight matrix before the rearrangement.

In an embodiment, the row number RID may not be stored because it is the same as a row number of the weight matrix after the rearrangement.

Referring back to FIG. 2, at step S130, row and column transformations are performed on the weight matrix of FIG. 4 using the rearrangement information generated at step S120.

During the row transformation, rows of the weight matrix are rearranged according to the rearrangement information shown in FIG. 5C.

Figure 6:
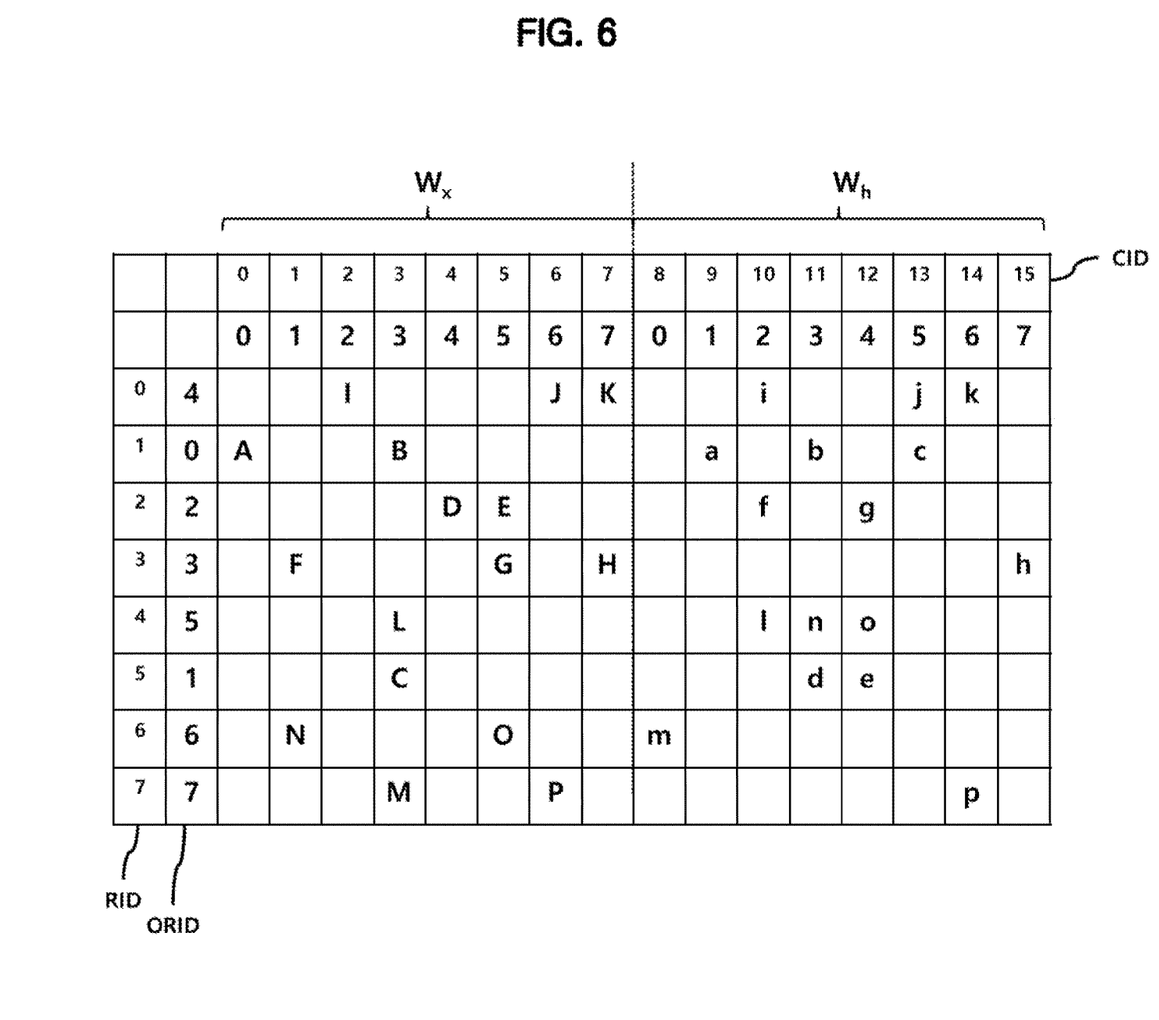
FIG. 6 shows a table illustrating a result of rearranging rows of a weight matrix according to an embodiment of the present disclosure.

FIG. 6 shows a table illustrating a result of rearranging the rows of the weight matrix of FIG. 4.

The row transformation is performed on the entire weight matrix.

The leftmost field of FIG. 6 represents a row number RID of a current weight matrix, which is the weight matrix after the rearrangement, and the next field represents an old row number ORID of a previous weight matrix, which is the weight matrix before the rearrangement.

The topmost field of FIG. 6 represents a column number CID of the current weight matrix and the next field represents a column number of the first weight matrix $W_x$ and a column number of the second weight matrix $W_h$.

As described in FIGS. 3A to 3C, the second weight matrix $W_h$ of the LSTM layer 10 is multiplied by the previous output vector $h_{t-1}$.

Since rows of the output vector are determined by the rows of the weight matrix, if the rows of the weight matrix are rearranged, the rows of the output vector are automatically rearranged to reflect the rearrangement of the rows of the weight matrix.

Accordingly, in the present disclosure, the rows of the second weight matrix $W_h$ to be multiplied with the previous output vector $h_{t-1}$ are rearranged in accordance with the rearrangement of the rows of the weight matrix.

In this disclosure, the first weight matrix, e.g., $W_x^{(1)}$, of the next LSTM layer, which is multiplied by the output vector, e.g., $h_t^{(0)}$, of the current LSTM layer, is rearranged by reflecting the rearrangement of the rows of the current LSTM layer.

Figure 7:
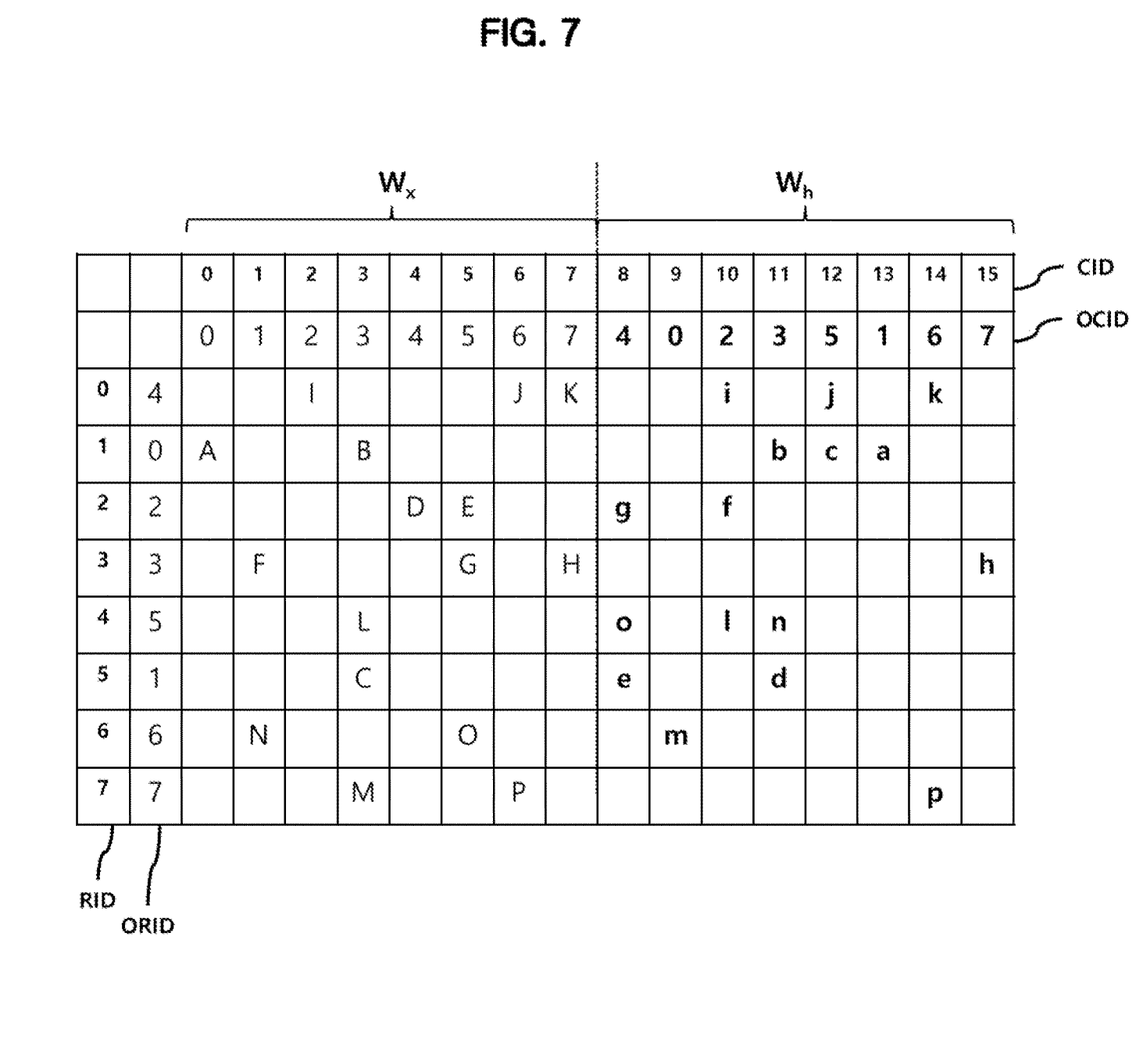
FIG. 7 shows a table illustrating a result of rearranging columns of a weight matrix according to an embodiment of the present disclosure.

FIG. 7 shows a result of the column transformation on the weight matrix whose rows have been rearranged as shown in FIG. 6.

The topmost field of FIG. 7 is a current column number CID after rearrangement, and the next field represents an old column number OCID which corresponds to a column number before rearrangement based on column numbers of the first weight matrix $W_x$ and the second weight matrix $W_h$.

The current LSTM layer shown in FIG. 7 may be the first LSTM layer. In this case, the column transformation is limited to the second weight matrix $W_h$, and the columns of the second weight matrix $W_h$ are rearranged to reflect the row transformation in the current LSTM layer, as shown in FIG. 7. As shown in FIG. 7, the columns of the second weight matrix $W_h$ are rearranged according to the row rearrangement order (4 0 2 3 5 1 6 7).

The column transformation is performed on the second weight matrix $W_h$ because of the recursive structure in which the LSTM layer uses the previous output vector $h_{t-1}$ as an input.

For the second or later LSTM layer, the column transformation must be performed on both the first weight matrix $W_x$ and the second weight matrix $W_h$.

At this time, the output vector, e.g., $h_t^{(0)}$, from the previous LSTM layer is input to the current LSTM layer as an input vector, e.g., $x_t^{(1)}$, and is multiplied with the first weight matrix, e.g., $W_x^{(1)}$.

Elements of the output vector from the previous LSTM layer are rearranged to reflect the row rearrangement of the weight matrix of the previous LSTM layer.

Accordingly, the first weight matrix $W_x$ of each of the second and subsequent LSTM layers must perform column transformation reflecting the row rearrangement of the weight matrix in the previous LSTM layer.

The second weight matrix $W_h$ of each of the second and subsequent LSTM layers must perform the column transformation reflecting the row rearrangement of the current LSTM layer as in the first LSTM layer.

Returning to FIG. 2, rows of the rearranged weight matrix are distributed to a plurality of processing elements (PEs) substantially evenly at step S140.

In the present embodiment, the rows of the rearranged weight matrix are distributed to the plurality of PEs substantially evenly, such that a maximum value among sums of row lengths allocated to the plurality of PEs is minimized.

This minimizes a waiting time required to complete a processing operation in a PE.

Figure 8A:
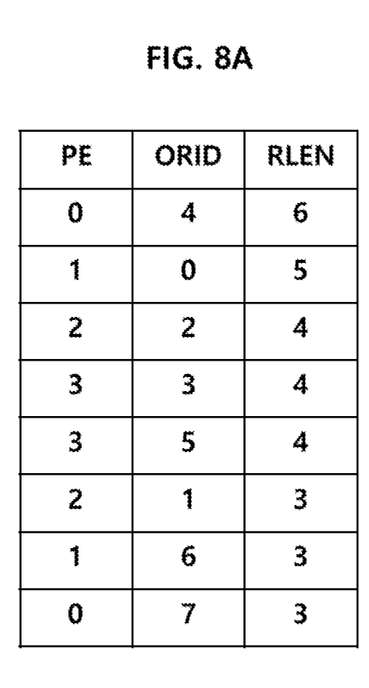
FIGS. 8A and 8B show tables illustrating a method of allocating rows of a weight matrix to processing elements according to an embodiment of the present disclosure.

FIG. 8A shows a method of distributing rows to four PEs.

In FIG. 8A, the old row number ORID representing a row number before the row rearrangement is included.

First, the 4th row having the greatest row length RLEN, e.g., 6, is allocated to the 0th PE, and then 0th, 2nd, and 3rd rows are allocated to the 1st, 2nd, and 3rd PEs, respectively.

The subsequent rows, e.g., 5th, 1st, 6th, and 7th rows, are sequentially allocated to the PEs each having the smallest sum of the row lengths after each allocation.

When there are a plurality of PEs having the smallest row length after each allocation, any one of them can be selected.

For example, the 5th row having the row length RLEN of 4 is allocated to the 3rd PE, which is one of the PEs, e.g., the 2nd and 3rd PEs. The 2nd and 3rd PEs have the smallest sum of the row lengths, e.g., 4, after the 4th, 0th, 2nd, and 3rd rows are sequentially allocated to the 0th, 1st, 2nd, and 3rd PEs.

Then, the 1st row with the row length RLEN of 3 is allocated to the 2nd PE, which is the PE having the smallest sum of the row lengths, e.g. 4, after the 5th row is allocated to the 3rd PE.

Then, the 6th row with the row length RLEN of 3 is allocated to the 1st PE, which is the PE having the smallest sum of the row lengths, e.g., 5, after the 1st row is allocated to the 2nd PE.

Finally, the 7th row with the row length RLEN of 3 is allocated to the 0th PE, which is the PE having the smallest sum of the row lengths, e.g., 6, after the 6th row is allocated to the 1st PE.

Figure 8B:
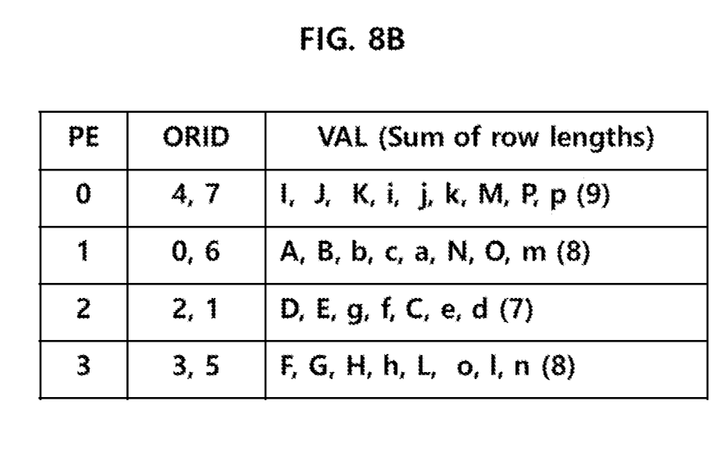

FIG. 8B is a table showing the row numbers ORID of the rows allocated to the PEs, values "VAL" included in the respective rows, and the sum of the row lengths for each PE.

Thereafter, referring back to FIG. 2, the weight matrix is encoded in a predetermined form to generate formatted data at step S150.

Figures 9A, 9B:
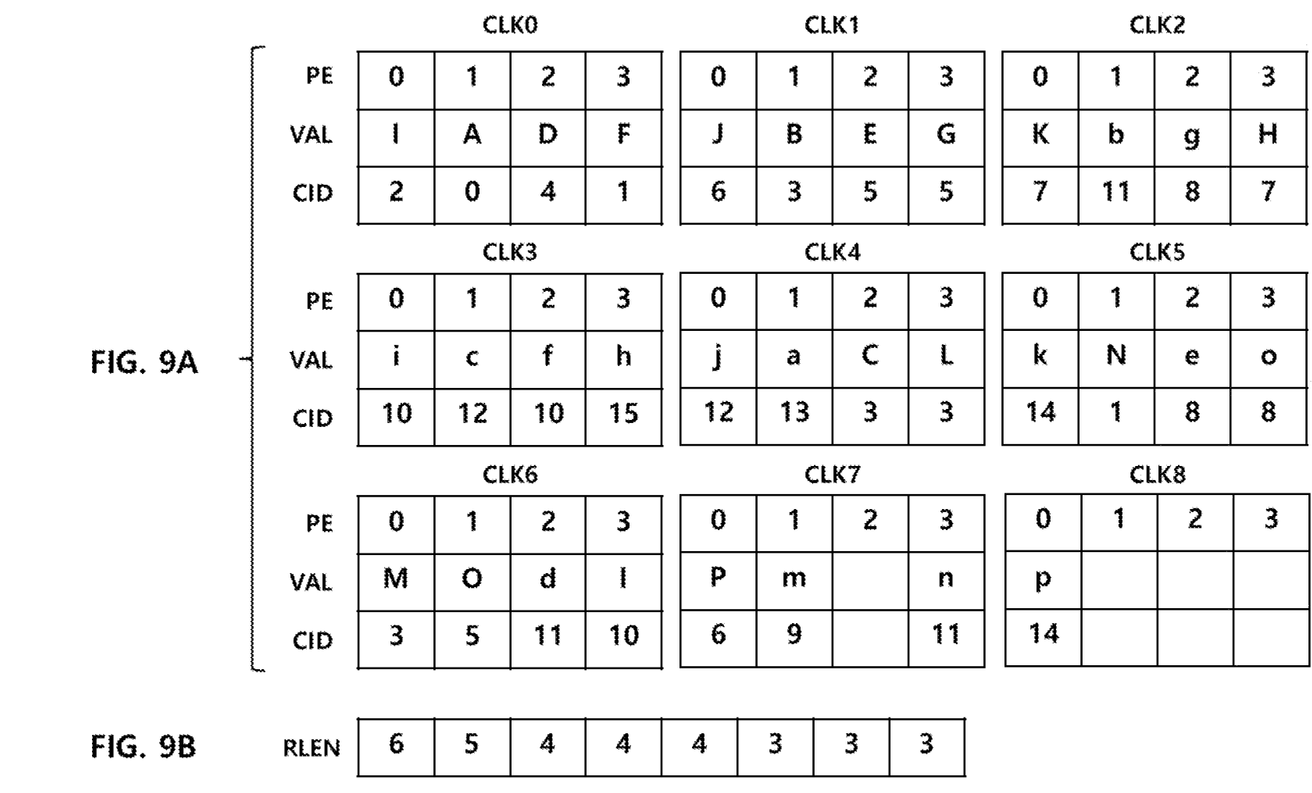
FIGS. 9A to 9C show tables illustrating a result of formatting a weight matrix according to an embodiment of the present disclosure.
Figure 9C:
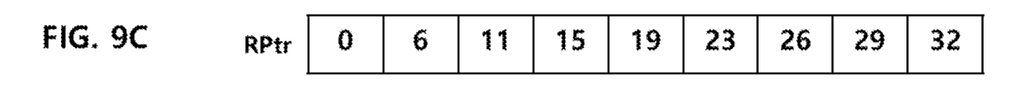

FIGS. 9A to 9C show tables illustrating formatted data generated according to an embodiment of the present disclosure.

In the present disclosure, the weight matrix is encoded in consideration of evenly distributed parallel processing in a plurality of PEs while reducing the size of data.

In this embodiment, the formatted data is divided into a plurality of data groups to increase the parallel processing performance of a plurality of PEs, and each data group is set so that the parallel processing is performed in as many PEs as possible.

In this embodiment, each data group can be sequentially transmitted in synchronization with a clock.

When there are sufficient bandwidth and memory size, a plurality of data groups may be transmitted at a time.

FIGS. 9A to 9C show formatted data that includes nine data groups, and these data groups are sequentially transmitted in synchronization with 9 clocks.

At this time, the number of data groups, i.e., 9, corresponds to the maximum sum of row lengths, i.e., 9, shown in FIG. 8B.

In FIG. 9A, the data group transmitted at a 0th clock CLK0 includes the value VAL and the column number CID of the weight matrix to be provided to each of the 0th, 1st, 2nd, and 3rd PEs.

In FIG. 9A, the column number CID indicates the column number CID of the weight matrix in FIG. 7 that corresponds to each value VAL.

Accordingly, the data group to be transmitted at the 0th clock cycle CLK0 may have a form of {(I, 2), (A, 0), (D, 4), (F, 1)} considering an order of the corresponding PEs.

The data groups transmitted at a 1st clock CLK1 to a 6th clock CLK6 can be generated in a similar manner in consideration of the values VAL shown in FIG. 8B and the weight matrix shown in FIG. 7.

In the data group transferred at a 7th clock CLK7, only the values for the 0th, 1st, and 3rd PEs are included. Therefore, the data group may have a form of {(P, 6), (m, 9), NULL, (n, 11)}. The data group transferred at an 8th clock CLK8 may have a form of {(P, 14), NULL, NULL, NULL} since it contains only the value for the 0th PE.

In FIG. 9A, only the column number CID of each value is included. In another embodiment, each PE may also require information related to the row number RID of each value.

For this purpose, it is necessary to additionally include information related to the row number RID of each value.

Basically, a corresponding row number RID can be added for each value in FIG. 9A. At this time, the row number RID to be added to FIG. 9A corresponds to the row number RID of the weight matrix in FIG. 7.

In this case, since a same row number may be included several times in data groups, encoding information capable of being used to decode the row number RID can be included instead to reduce the data size.

Data shown in FIGS. 9B and 9C show examples of the encoding information.

The encoding information shown in FIG. 9B includes eight row lengths RLEN corresponding to the row numbers RID of the 0th row to the 7th row.

A decoder receiving the data can derive row numbers RID corresponding to values sequentially provided to each PE by applying the same rule of equally allocating a plurality of rows to a plurality of PEs as shown in FIGS. 8A and 8B.

Encoding information shown in FIG. 9C is a slightly modified version of the encoding information shown in FIG. 9B, and includes pointer values RPtr for each row.

In FIG. 9C, a pointer of the 0th row is assumed to be 0, and a pointer of the next row is generated by accumulating the row length RLEN for each of the previous rows.

Although not shown in FIGS. 9A to 9C, each LSTM layer transmits row rearrangement information described in FIG. 5C.

By transmitting the data groups shown in FIG. 9A, encoding information shown in FIG. 9B or FIG. 9C, and the row rearrangement information shown in FIG. 5C, the relationship between the current row number and the old row number which corresponds to a row number before the row transformation can be known, and the relationship between the current column number of the second weight matrix and the old column number of the second weight matrix before the column transformation can be known.

The remaining data other than the data groups of FIG. 9A may be transmitted in synchronization with a separate clock, or may be transmitted together with any one of the data groups of FIG. 9A in consideration of a size of the data groups.

Returning to FIG. 2, it is determined whether a next LSTM layer exists, at step S160.

If there is the next LSTM layer, the process returns to step S110 and the subsequent steps are repeated for the next LSTM layer.

If the next LSTM layer does not exist, the process is terminated.

The formatted data resulting from encoding the weight matrix can be output to an accelerator.

The formatted data can be output individually whenever an encoding operation for each LSTM layer is completed, or can be output when the entire encoding operation for all the LSTM layers is completed.

Figure 10:
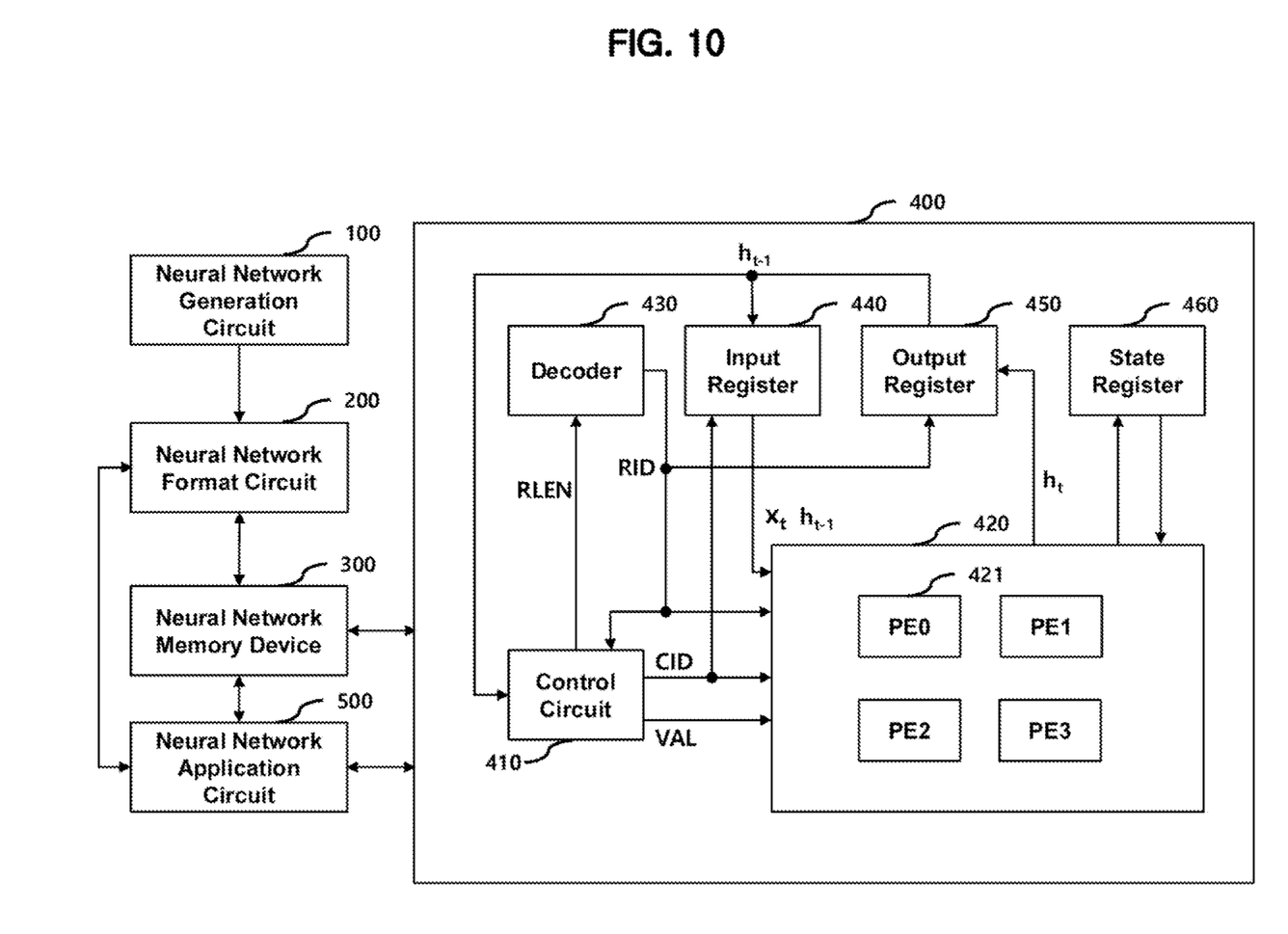
FIG. 10 illustrates a neural network system according to an embodiment of the present disclosure.

FIG. 10 illustrates a neural network system according to an embodiment of the present disclosure.

The neural network system includes a neural network generation circuit 100, a neural network format circuit 200, a neural network memory device 300, a neural network application circuit 500, and an accelerator 400.

The neural network generation circuit 100 performs a neural network training operation for determining a weight matrix of a neural network in order to generate the neural network. The neural network generation circuit 100 also prunes the weight matrix to make the weight matrix be sparse.

The neural network format circuit 200 performs the formatting operation described with reference to FIGS. 2 to 9C to format the weight matrix in the form shown in FIGS. 9A to 9C.

The neural network memory device 300 stores the formatted data.

The neural network application circuit 500 controls an overall operation of generating an input vector from an externally input signal, controlling the accelerator 400 to generate an output vector, and outputting the output vector to the outside.

The neural network application circuit 500 may communicate with the neural network format circuit 200 to send and receive information relating to the neural network formatting operation and store the neural network format result in the memory device 300.

The accelerator 400 receives the formatted data stored in the memory device 300, receives the input vector provided from the neural network application circuit 500 to perform a neural network operation to thereby generate the output vector, and provides the output vector to the neural network application circuit 500.

In some embodiments, the accelerator 400 may directly read the formatted data stored in the memory device 300 using a direct memory access (DMA) technique or may receive the formatted data via the neural network application circuit 500.

The accelerator 400 of FIG. 10 uses the LSTM network, which has been described above with reference to FIGS. 1 to 9C, as a neural network.

In this embodiment, the accelerator 400 includes a control circuit 410, a PE array 420, a decoder 430, an input register 440, an output register 450, and a state register 460.

The PE array 420 includes a plurality of PEs 421. 4 PEs are exemplarily shown in FIG. 10.

The number of PEs included in the accelerator 400 matches the number of PEs that affects the data format shown in FIGS. 9A to 9C.

The control circuit 410 controls the other components in the accelerator 400 using the formatted data, i.e., the formatted weight matrix, and controls the neural network operation in the order of layers included in the neural network.

In the following description, the accelerator 400 sequentially performs operations on the data shown in FIG. 9A per clock.

It is assumed that the row length information RLEN shown in FIG. 9B and the row rearrangement information shown in FIG. 5C are provided to the accelerator 400 before the data shown in FIG. 9A is provided to the accelerator 400.

The control circuit 410 provides the decoder 420 with the formatted data including the row length information RLEN.

The decoder 420 identifies a row number RID that is allocated to a corresponding PE in the same manner as shown in FIG. 8B, using the row length information RLEN and data groups formatted as shown in FIG. 9A, and outputs the identified row number RID.

The control circuit 410 sequentially supplies data groups formatted as shown in FIG. 9A to the PE array 420.

The data group includes a value VAL and a column number CID that are to be allocated to each PE 421.

The row number RID corresponding to the value VAL may be provided from the decoder 430.

The input register 440 provides the input vector $x_t$ and the previous output vector $h_{t-1}$ to the PE array 420.

Each of the plurality of PEs 421 in the PE array 420 identifies a value of the previous output vector $h_{t-1}$ and a value of the input vector $x_t$ to be multiplied with the presently provided value VAL through the row number RID and the column number CID, and performs a multiplication operation on the value VAL, the output vector $h_{t-1}$, and the input vector $x_t$.

Each of the plurality of PEs 421 may accumulate a result of the multiplication operation at a current clock with a result of the multiplication operation at a previous clock.

Thus, each of the plurality of PEs performs the multiplication operation on a specified row of the weight matrix, the input vector $x_t$, and the previous output vector $h_{t-1}$ at each clock. After the multiplication operation is performed for 9 clocks, the multiplication operation between the input vector $x_t$ and the previous output vector $h_{t-1}$ is completed.

In the present invention, since the number of multiplication operations to be performed by the plurality of PEs 421 is relatively evenly distributed, a delay time required to wait for an available processing time in any PE 421 can be minimized.

The PE array 420 may perform additional operations on the multiplication result between the weight matrix and the input vector $x_t$ and the previous output vector $h_{t-1}$ to generate the output vector $h_t$.

For this purpose, the plurality of PEs 421 may include additional operation circuits.

The additional operation circuits are determined according to operations performed in an LSTM layer. Since the additional operation circuits configured to generate the output vector $h_t$ are well known, detailed description thereof is omitted.

The output vector $h_t$ is provided to the output register 450, and the output register 450 stores the output vector $h_t$ and outputs the stored output vector as the previous output vector $h_{t-1}$ to the input register 440 to perform the next multiplication operation.

At the beginning of the operation in the LSTM layer, the previous output vector $h_{t-1}$ may be initialized to an arbitrary value such as 0.

For example, the input register 440 outputs the received previous output vector $h_{t-1}$ as the previous output vector $h_{t-1}^{(0)}$ for the operation for the current LSTM layer and also outputs the received previous output vector $h_{t-1}$ as an input vector $x_t^{(1)}$ of the next LSTM layer, as illustrate din FIG. 1.

The state register 460 may temporarily store the information, e.g., values VALs, generated during the operation performed in the PE array 420 and may provide the temporarily stored information to the PE array 420 again.

The control circuit 410 proceeds to the next LSTM layer when the operations are completed for the current LSTM layer.

The output vector $h_t$ generated when the final LSTM layer is processed reflects the row and column transformations performed in the multiple LSTM layers.

Thus, the order of elements of the output vector $h_t$ is rearranged to correspond to the input vector $x_t$.

When formatting is performed as in the present embodiment, the row rearrangement information for the previous LSTM layer is reflected in the column transformation of the next LSTM layer.

Accordingly, the control circuit 410 of the present disclosure rearranges the previous output vector $h_{t-1}$ output from the output register 450 after the final LSTM layer is processed using the row rearrangement information for the final LSTM layer, and outputs the rearranged output vector to the neural network application circuit 500 as a final output vector.

The neural network application circuit 500 can complete a reasoning operation using the final output vector output from the accelerator 400.

The neural network system in FIG. 10 may be deployed in client-server architecture.

For example, the neural network generation circuit 100 and the neural network format circuit 200 may be located at the server end, and the memory device 300, the accelerator 400, and the neural network application circuit 500 may be located at the client end.

For example, a machine translation system can be configured to receive and store formatted weight matrix data in a server and to store sentence data input through a microphone or the like in a mobile device.

At this time, the neural network format circuit 200 located in the server can communicate with the mobile device and generate formatted data. For example, if the mobile device provides the number of PEs to the server, the neural network format circuit 200 located in the server may generate and transmit the formatted data corresponding to the number of PEs.

Those of ordinary skill in the art will be able to derive various embodiments with reference to the above disclosure.

Figure 11:
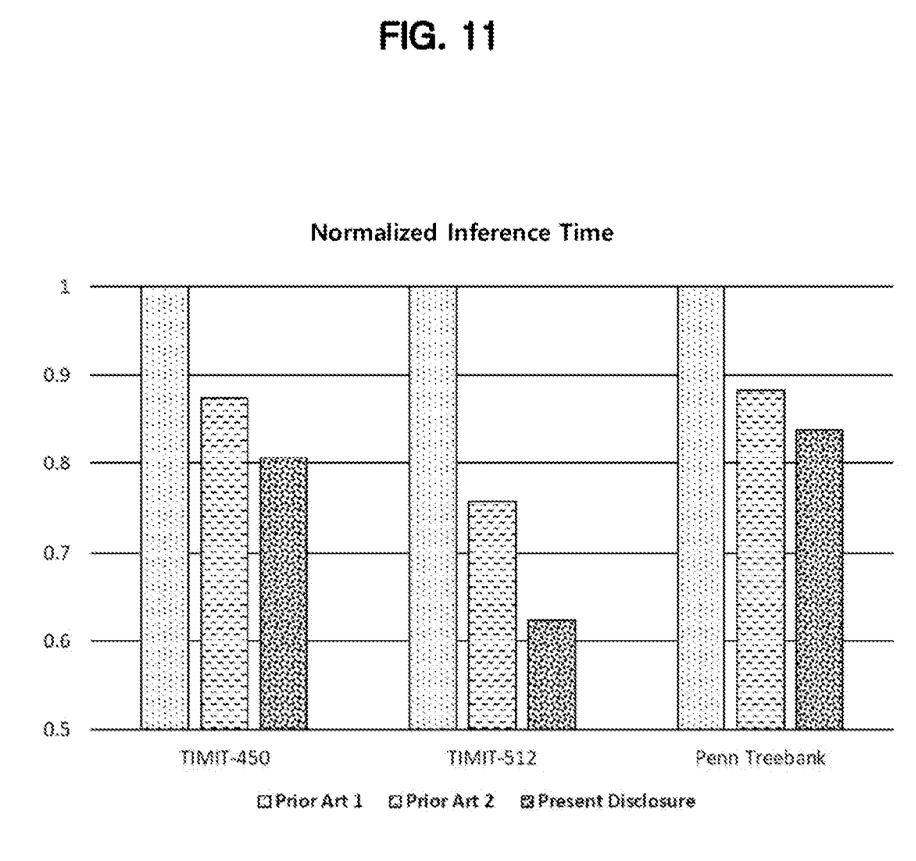
FIG. 11 shows a graph illustrating an effect of an embodiment of the present disclosure.

FIG. 11 shows a graph illustrating an effect of an embodiment of the present disclosure.

The graph of FIG. 11 illustrates a result of comparing a case where the conventional formatting method is applied to three types of LSTM networks with a case where a formatting method according to the present disclosure is applied to the three types of LSTM networks.

The three types of LSTM networks include TIMIT-450, TIMIT-512, and Penn Treebank.

In FIG. 11, "Prior Art 1" shows a case in which the CSC/CSR method is applied, and "Prior Art 2" shows a case in which the CISR method is applied.

The vertical axis represents a normalized inference time.

As can be seen from the graph of FIG. 11, when the formatting method according to the present disclosure is applied to the three types of LSTM networks, an execution time or inference time is significantly reduced because the computation load is evenly distributed among a plurality of PEs by the formatting operation.

The LSTM architecture according to the embodiments of the present disclosure may be used in applications of speech recognition, language modeling, translation, moving picture recognition, and so on.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A method of formatting a weight matrix in a current layer included in a neural network, the method comprising:
    determining a row length for each row of the weight matrix, the row length corresponding to a number of elements each having a non-zero value in each row, the weight matrix including a plurality of elements that are arranged in a plurality of rows and a plurality of columns;
    obtaining rearrangement information including a result of sorting the rows in order of size of the determined row lengths;
    performing a row transformation on the weight matrix and a column transformation on the weight matrix, using the rearrangement information, thereby generating a transformed weight matrix;
    distributing rows of the transformed weight matrix to a plurality of processing elements (PEs); and
    generating formatted data including one or more data groups each including non-zero values of elements of the transformed weight matrix that are processed in the PEs and column information of the non-zero values,
    wherein performing the row transformation includes rearranging an order of rows of the weight matrix according to the rearrangement information,
    wherein performing the column transformation includes rearranging an order of columns of the weight matrix according to previous rearrangement information generated for a previous layer of the current layer, and
    wherein the distributing is performed such that a maximum value among sums of row lengths becomes minimized, each of the sums of row lengths representing a sum of row lengths of rows distributed to each of the PEs.

2. The method of claim 1, wherein the formatted data further includes row information corresponding to rows associated with the non-zero values of elements of the transformed weight matrix.

3. The method of claim 2, wherein the row information includes row numbers corresponding to the rows associated with the non-zero values or encoding information from which the row numbers are decoded.

4. The method of claim 3, wherein the encoding information includes row lengths of the rows of the transformed weight matrix.

5. The method of claim 1, wherein the neural network is a Long Short-Term Memory (LSTM) network including one or more LSTM layers.

6. The method of claim 5, wherein the weight matrix includes a first weight matrix and a second weight matrix, the first weight matrix being multiplied with an input vector, the second weight matrix being multiplied with a previous output vector, and
    wherein the method further includes disposing the first weight matrix and the second weight matrix in a row.

7. The method of claim 6, wherein performing the row transformation includes rearranging an order of the rows of the first weight matrix and the second weight matrix according to the rearrangement information.

8. The method of claim 7, wherein performing the column transformation includes rearranging an order of columns of the first weight matrix according to the previous rearrangement information and rearranging an order of columns of the second weight matrix according to the rearrangement information.

* * * * *